United States Patent
Aharon

(10) Patent No.: US 12,247,869 B2
(45) Date of Patent: Mar. 11, 2025

(54) SAMPLING HIGH POWER BEAM PROFILING

(71) Applicant: Oren Aharon, Haifa (IL)

(72) Inventor: Oren Aharon, Haifa (IL)

(73) Assignee: Oren Aharon, Haifa (IL)

( * ) Notice: Subject to any disclaimer, the term of this patent is extended or adjusted under 35 U.S.C. 154(b) by 144 days.

(21) Appl. No.: 18/223,583

(22) Filed: Jul. 19, 2023

(65) Prior Publication Data

US 2025/0027810 A1    Jan. 23, 2025

(51) Int. Cl.
    *G01J 1/42*    (2006.01)
    *G01J 1/04*    (2006.01)

(52) U.S. Cl.
    CPC ........... *G01J 1/4257* (2013.01); *G01J 1/0403* (2013.01)

(58) Field of Classification Search
    CPC .............................. G01J 1/4257; G01J 1/0403
    See application file for complete search history.

(56) References Cited

U.S. PATENT DOCUMENTS

2018/0031417 A1*   2/2018   Morimiya ................. G01J 1/02

FOREIGN PATENT DOCUMENTS

WO    WO-2018139486 A1 *   8/2018   ............. G02B 26/02

* cited by examiner

*Primary Examiner* — Thanh Luu
*Assistant Examiner* — Monica T Taba

(57) ABSTRACT

The present invention introduces a high-power beam profiling system with versatile beam sampling capabilities, designed specifically for measuring multi-kilowatt laser beams. To overcome the limitations of traditional sampling devices that scan the laser beam for measurements, my invention employs a rotating beam sampler. This sampler swiftly traverses the beam for a brief period, capturing a momentary sample which is then reflected to a preferred measuring device such as a camera beam profiler. By capturing a snapshot of the beam, the camera determines the beam size efficiently. The device is inherently cooled by the rotating sampler's movement in the air, coupled with the assistance of external cooling nozzles. It comprises a low-reflectivity mirror, a mechanical arrangement for precise positioning of the mirror, a rotating motor, an additional low-reflectivity mirror, a beam profiling camera, and the necessary micro-controller and algorithm for image processing and calculating the beam profiles.

2 Claims, 2 Drawing Sheets

SAMPLING HIGH POWER BEAM PROFILING

BACKGROUND OF THE INVENTION

1. Field of Invention

The present invention introduces a precise and non-contact measuring device specifically designed to measure high-power lasers, ranging from kilowatts and beyond. These measurements can be conducted online, with minimal interference from the laser power (less than 1%), or offline using a standalone device.

Conventional detecting technologies are incapable of withstanding the intensity of high-power laser beams, resulting in potential destruction or damage, as well as a significant decline in laser beam quality during measurements. Existing methods, as described in previous patents such as U.S. Pat. No. 6,526,077B1 by Tabirian and U.S. Pat. Nos. 4,260,255 and 4,035,088 by Wachs and Jenkin, commonly utilize needle-like beam sampling devices that scan the laser beam while monitoring its reflection with an external detector. These methods suffer from two major drawbacks. Firstly, they disturb the trajectory of the beam, and secondly, they require a relatively long time to perform the measurement.

Beam profilers that employ opaque scanning devices like knife-edges, pinholes, and other blocking devices also have disadvantages as they obstruct the beam and result in lengthy and non-instantaneous measurements. The goal of the present measuring device is to provide a laser beam profiler suitable for very high-power laser beams, utilizing beam sampling and active cooling of the sampling mirror, combined with rapid snapshotting of images using a mosaic camera device.

Furthermore, through careful design, this device enables online measurements with minimal disturbance to the main beam, thus offering the possibility of real-time feedback on the beam's profile.

2. Description of the Related Art

The existing technology for analyzing high-power beams involves sampling a fraction of the beam power that exhibits an identical beam profile to the main beam. These samplers split the beam into two identical beams with the same footprint but different power levels. By examining the low-power beam, it becomes possible to extrapolate the results to the high-power main beam. While the classical technology for beam sampling is well-known, as laser power levels continue to increase, sampling without distortion becomes increasingly challenging. The high-power exposure causes distortion in the sampling beam splitter, rendering the sampled beam inadequate for accurate measurements. Furthermore, there is a need to protect the sampling surfaces from contamination by burnt dust particles.

To overcome the challenges posed by very high-power lasers, the present invention offers a solution that involves constructing an air-cooled beam sampler. This beam sampler is subjected to a rotary movement driven by windjets, ensuring that it is exposed to the beam for only a short duration, long enough to perform the necessary measurements before the next sampling is required. The solution incorporates an optical beam sampler mounted on a rotating axis, equipped with specially designed air-cooling jets. These jets provide localized cooling to the beam sampler and drive it in a rotary motion, minimizing the exposure time to very high-power beams.

The sampled beam is then directed to a synchronized beam profiler, which captures the reflected beam precisely in time for further processing and analysis. By coordinating the rotating beam sampler and the beam profiler, accurate measurements can be obtained efficiently.

SUMMARY

The present invention introduces a method and system for accurately measuring laser beams with extreme power levels across a wide range of wavelengths. The system incorporates a unique sampling technology utilizing a low reflectivity beam sampler, which redirects a reduced portion of the input beam towards a beam profiler based on current camera technologies. To address overheating concerns, the invention employs a beam sampler that intermittently samples the beam during each cycle, with an opto-switch signaling the sampling process. The sampler swiftly traverses the beam for a brief duration, capturing a momentary sample that is then directed to a preferred measurement device, such as a camera-based beam profiler. The sampler's mechanism facilitates self-air cooling, supplemented by an external windjet nozzle drawing pressurized air from an external source. This design enables real-time beam profile measurement without compromising the quality of the beam's operation. The proposed apparatus includes a low-reflectivity mirror, a precise mechanical arrangement for mirror rotation, a rotating motor, a windjet nozzle for additional cooling, a beam profiling camera, and a microcontroller with image processing algorithms for calculating beam profiles.

In summary, the disclosed apparatus enables precise measurement of laser beams with high power levels. It consists of a moving beam sampler with low reflectivity, rapidly scanning the laser beam being analyzed and redirecting the sampled beam to a laser beam profiler for accurate beam characterization. An opto-switch ensures synchronization between the sampler's position and the imaging process of the beam profiler. A microcontroller processes the captured images and controls the airflow and motors. To maintain optimal temperatures, a cooling nozzle directs airflow towards the beam sampler. Alternatively, the beam sampler can be activated with a plurality of mechanisms driving it through the beam swiftly and momentarily to achieve swift measurements without sampler's overheating. Furthermore, short summary for the apparatus performing very high-power laser measurements using multi-spectral beam profiling is disclosed wherein the apparatus has a beam sampler mounted on a rotating drum designed to scan the laser beam under examination. The said laser beam profiler is positioned to receive the reflected beam from the beam sampler and the synchronization between position of beam sampler and rotating drum is achieved by an opto-switch which enables accurate acquisition of the beam profile image. An air cooling nozzle directing its airflow towards the beam sampler and drives the rotating drum by impelling the drum's built-in blades.

BRIEF DESCRIPTION OF THE DRAWINGS

Further advantages of the invention will emerge from the following descriptions and drawings, which are provided as non-limiting example and in which.

DETAILED DESCRIPTION OF THE DRAWINGS

Figure 1:
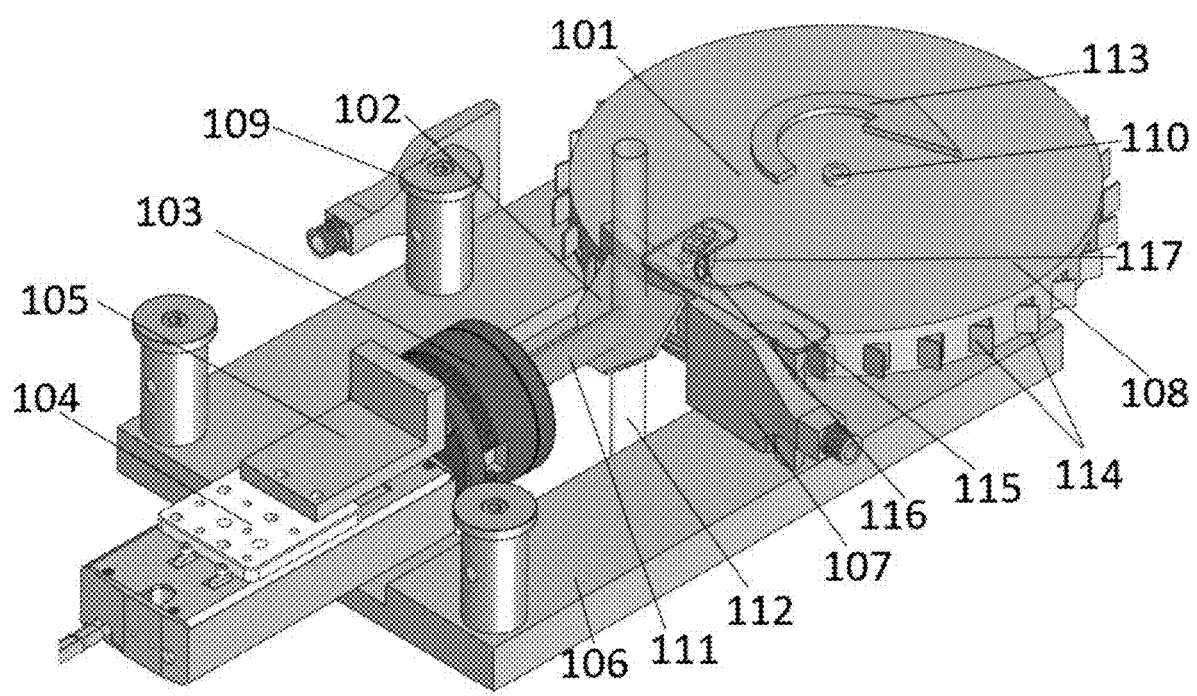
FIG. 1 is a view describing the proposed high power laser beam profiler.

FIG. 1 illustrates a system embodiment utilizing a rotating wheel to rapidly drive the beam sampler through the high-power laser beam. As the beam sampler traverses the laser beam, it divides the beam into two components: one that continues through with over 99% of the power, and the other that is redirected orthogonally to a laser beam profiler with significantly less power (less than 1%). Beam 101 represents the high-power laser beam under examination, possessing kilowatts of power. The Beam Sampler 102 which is firmly attached to a rotating drum 108 collects a sample of the beam and directs it to the laser beam profiler 103 for measuring the laser's profile. The circumference of the rotating drum is significantly larger than dimensions of the beam sampler by a factor of 10. The Linear Stage 104 allows the beam profiler to sample the beam along its propagation axis, and Mechanical Member 105 connects the beam profiler to the stage. These components are situated on a Mechanical Plate 106. Windjet 107 cools the beam sampler while simultaneously rotating its said drum 108. The beam sampler's dimension is much smaller than the drum's circumference, ensuring that the sampling time through the beam during each full rotation is very brief. The center of rotation for the drum is marked as 110. Additionally, Windjet 109 further cools the device and rotates the drum. The Sampled Beam 111 is directed to the camera for analysis, while the Main Beam 112 remains mostly undisturbed, facilitating real-time measurements. Said drum 108 is rotating as described by directional rotation arrow 113 and rotation is generated by air blower hitting the built-in blades denoted as 114. The generated pressurized air has a dual purpose cooling the said rotating beam sampler 102 as well as driving the drum. For synchronization between drum rotation and position of sampling an opto-switch denoted as 116 is used where said opto-switch is attached to the stationary basis by a bracket denoted as 115, a flag attached to the rotating drum and denoted as 117 will synchronize between drum position and the position of sampler.

Figure 2:
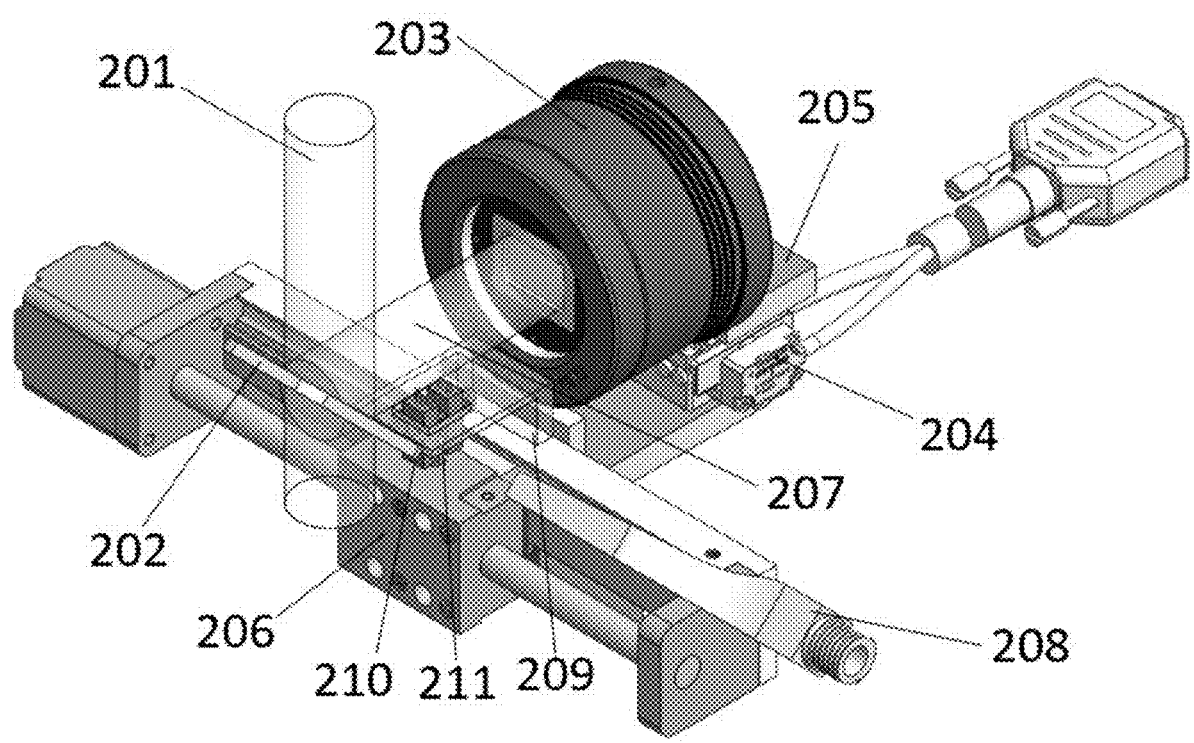
FIG. 2 describes the proposed high-power laser beam profiler with a linear stage driving the beam sampler.

FIG. 2 presents another configuration where the beam sampler's swift momentary movement is accomplished through a linear stage. In this setup, Beam 201 is sampled by Beam Sampler 202, and a fraction of the beam 207 is directed towards the Beam Profiler 203. The Beam Profiler is attached to a Linear Stage 204 through a Mechanical Member 205, allowing it to move along the propagation axis of the sampled beam 207. The Beam Sampler is momentarily moved through the beam using another Linear Stage 206, oriented perpendicular to the incoming beam axis, thereby enabling swift sampling and preventing excessive heat buildup. Windjet 208 blows pressurized clean cold air to cool the beam sampler, safeguarding its surface from damage caused by dust particles and preventing the surrounding air from overheating. A mechanical bracket denoted as 209 is firmly attached to the motor's stationary frame and has a mounted opto-switch denoted as 210, which has a slot for metal flag to sweep in between. When the metal flag 211 is passing through said opto-switch, it generates a signal for a synchronizing electronic device to mark the center of the sampling mirror.

The invention claimed is:

1. An apparatus for performing very high-power laser measurements using multi-spectral beam profiling, the apparatus comprising:
   a beam sampler, mounted on a rotating drum designed to scan the laser beam under examination;
   a laser beam profiler that receives the reflected beam from the beam sampler and performs the beam profiling;
   an opto-switch for synchronizing the position of the sampler with the acquisition of the beam profile image;
   a microcontroller responsible for image processing; and
   a cooling air nozzle that directs airflow onto the beam sampler and drives the rotating drum.

2. A multi-spectral beam profiler, wherein the beam scanning is achieved through linear motion, and the apparatus further comprises:
   a linear stage housing a beam sampler mounted on a carriage;
   a synchronizing electronic device ensuring precise alignment between the sampler's position and an imaging position for beam profiling;
   a microcontroller responsible for image processing; and
   a cooling nozzle designed to maintain optimal temperature conditions during operation.

* * * * *